(12) United States Patent
Wang

(10) Patent No.: US 11,493,237 B2
(45) Date of Patent: Nov. 8, 2022

(54) SOLAR HEATING SYSTEM FOR CYCLIC HEATING OF A SWIMMING POOL

(71) Applicant: ZHEJIANG CIPU POOL & SPA TECHNOLOGY CO., LTD, Ningbo (CN)

(72) Inventor: Huaiping Wang, Ningbo (CN)

(73) Assignee: ZHEJIANG CIPU POOL & SPA TECHNOLOGY CO., LTD., Ningbo (CN)

( * ) Notice: Subject to any disclaimer, the term of this patent is extended or adjusted under 35 U.S.C. 154(b) by 568 days.

(21) Appl. No.: 16/541,368

(22) Filed: Aug. 15, 2019

(65) Prior Publication Data

US 2020/0064026 A1 Feb. 27, 2020

(30) Foreign Application Priority Data

Aug. 23, 2018 (CN) .......................... 201821361370.8

(51) Int. Cl.
*F24S 20/00* (2018.01)
*H02S 40/44* (2014.01)

(52) U.S. Cl.
CPC .............. *F24S 20/02* (2018.05); *H02S 40/44* (2014.12)

(58) Field of Classification Search
CPC .......... F24S 20/02; F16L 33/00; F16L 33/001
See application file for complete search history.

(56) References Cited

U.S. PATENT DOCUMENTS

| 3,868,945 | A | * | 3/1975 | Konopka | ................ | F24S 10/72 |
| | | | | | | 126/563 |
| 2008/0202498 | A1 | * | 8/2008 | Ramos | .................. | F24S 10/506 |
| | | | | | | 126/626 |
| 2015/0320196 | A1 | * | 11/2015 | Polizzi | ..................... | A47B 5/06 |
| | | | | | | 320/101 |
| 2020/0011040 | A1 | * | 1/2020 | Medearis | ................ | F16K 21/18 |

FOREIGN PATENT DOCUMENTS

DE  102011054322 A1 * 4/2012 ............. H02S 20/23

OTHER PUBLICATIONS

Ahmet Demirbas, DE102011054322A1—Translation (Year: 2012).*

* cited by examiner

*Primary Examiner* — Vivek K Shirsat
(74) *Attorney, Agent, or Firm* — Charles C. Achkar; Ostrolenk Faber LLP.

(57) ABSTRACT

The present invention discloses a solar heating system for cyclic heating of a swimming pool, relating to the swimming pool heating technology. The solar heating system structurally comprises a swimming pool, solar heaters and a water pump. Compared with the prior art, a solar panel is mainly added, and the water pump is installed on a solar heater in an integrated way that the water pump is connected with not only the solar heater as a waterway, but also the solar panel as a power supply circuit. After the above-mentioned improvements, the whole solar heating system has the advantages such as a compact structure, convenient disassembly and assembly, and miniaturization. Since the solar panel independently supplies power to the water pump, the solar heating system can be used normally in an outdoor place far away from a mains socket. The application place is not restricted with wide application scope.

9 Claims, 5 Drawing Sheets

SOLAR HEATING SYSTEM FOR CYCLIC HEATING OF A SWIMMING POOL

CROSS REFERENCE TO RELATED APPLICATIONS

The present application claims the benefit of priority of Chinese Application No. 201821361370.8, filed Aug. 23, 2018 the subject matter of which is incorporated by reference.

FIELD OF INVENTION

The present invention relates a solar heating system, and in particular relates to a solar heating system for cyclic heating of a swimming pool.

BACKGROUND

People can fully enjoy a swimming pool which runs well. It is difficult to guarantee the normal use of the swimming pool because of too cold water in the swimming pool in a cold season, however. To maintain a proper water temperature, it is necessary to heat water in the swimming pool. The heating systems of the prior art mainly utilize electrical energy, oil, gas or other energies and all of them need to consume a large amount of precious resources or even cause environmental pollutions. As the solar heating technology becomes mature, the clean and pollution-free solar energy has been used to heat water in many swimming pools. The heating system usually comprises a swimming pool, solar heaters and a water pump which are airtightly connected with pipelines in turn to form a waterway circulation. When the heating system is used, the water in the swimming pool is drawn in by the water pump, then heated by solar heaters, and finally poured into the swimming pool. Thus, the water in the swimming pool is guaranteed to be always in a cyclic heating condition. The heating system is very popular with many consumers because the whole heating process is energy saving, environment-friendly and safe.

However, the structures of these solar heating systems currently used are too simple to cause many problems in practical applications. For example, 1) since the water pump and the solar heater are two separate components, not only the connections of too many parts are so troublesome that the structure of the whole solar heating system is confused at the disassembly and assembly of pipelines, but also a large installation space is occupied; 2) since the power supply of the water pump is unexceptionally connected to a mains socket, it is difficult to use the solar heating system in an outdoor place far away from a mains socket and the application places are restricted; 3) since the solar heaters are directly exposed in the air or installed in a fixed position, it is difficult to adjust the light-receiving area and the heating effect of the solar heaters is easily affected when the light application time and position deviate.

SUMMARY OF THE INVENTION

To overcome the defect of the prior art, the present invention is intended to provide a solar heating system for cyclic heating of a swimming pool, which has the advantages such as a compact structure, convenient disassembly and assembly, flexibility in application, unrestricted application places, an adjustable light-receiving area, miniaturization and top grade.

The present invention is realized by the following technical solution:

A solar heating system for cyclic heating of a swimming pool comprises a swimming pool, solar heaters and a water pump which are airtightly connected with pipelines in turn to form a waterway circulation, a solar panel is arranged on one side of said solar heaters, said water pump is installed on a solar heater in an integrated way, and said water pump is connected with not only the solar heater as a waterway, but also the solar panel as a power supply circuit.

Legs are arranged on the back of said solar heaters, the upper ends of said legs are hinged on the back of the solar heaters, the lower ends of said legs are free, and the length of the lower ends is adjustable.

Said legs rotate around the upper hinge points and the lower ends of said legs are obliquely supported on the ground or closely touch the back of the solar heaters.

An installation platform is arranged on the back of said solar heaters, a water inlet connector and a water outlet connector which are connected with the solar heaters are arranged on said installation platform, said water pump is fixedly installed on the platform, the water inlet of the water pump is airtightly connected with the water inlet connector, and the water outlet of the water pump is airtightly connected with the water outlet connector.

Said installation platform is arranged at the top left corner of the back of the solar heater and a bottom cover for pressing and fixing the water pump is arranged on the platform.

At least two said solar heaters are arranged, a connection pipe is arranged between two adjacent solar heaters and said solar panel is installed on said connection pipe.

A power cord plug is arranged on said solar panel.

Said solar heaters are in the shape of a rectangular plate and a water inlet opening and a water outlet opening are respectively arranged on the two sides of the rectangular plate.

A groove is respectively arranged on the two sides of said rectangular plate, and said water inlet opening and water outlet opening are embedded in the grooves.

A transverse slot is arranged at the top of the back of said solar heaters.

Compared with the prior art, a solar panel is mainly added on one side of solar heaters of the present utility model, and the water pump is installed on a solar heater in such an integrated way that the water pump is connected with not only the solar heater as a waterway, but also the solar panel as a power supply circuit. After the above-mentioned improvements, the whole solar heating system has the advantages such as a compact structure, a small installation space, convenient disassembly and assembly, flexibility in application, miniaturization and top grade. Since the solar panel independently supplies power to the water pump, the solar heating system can be used normally in an outdoor place far away from a mains socket. The application place is not restricted, and the scope of application is wide. In addition, adjustable legs are arranged on the back of the solar heaters so that the light-receiving area of the solar heaters can flexibly be adjusted according to the light application time and position and the heating effect of the solar heaters is enhanced.

DETAILED DESCRIPTION OF THE INVENTION

The following will describe in detail the embodiment of the present invention according to the drawings.

Figure 1:
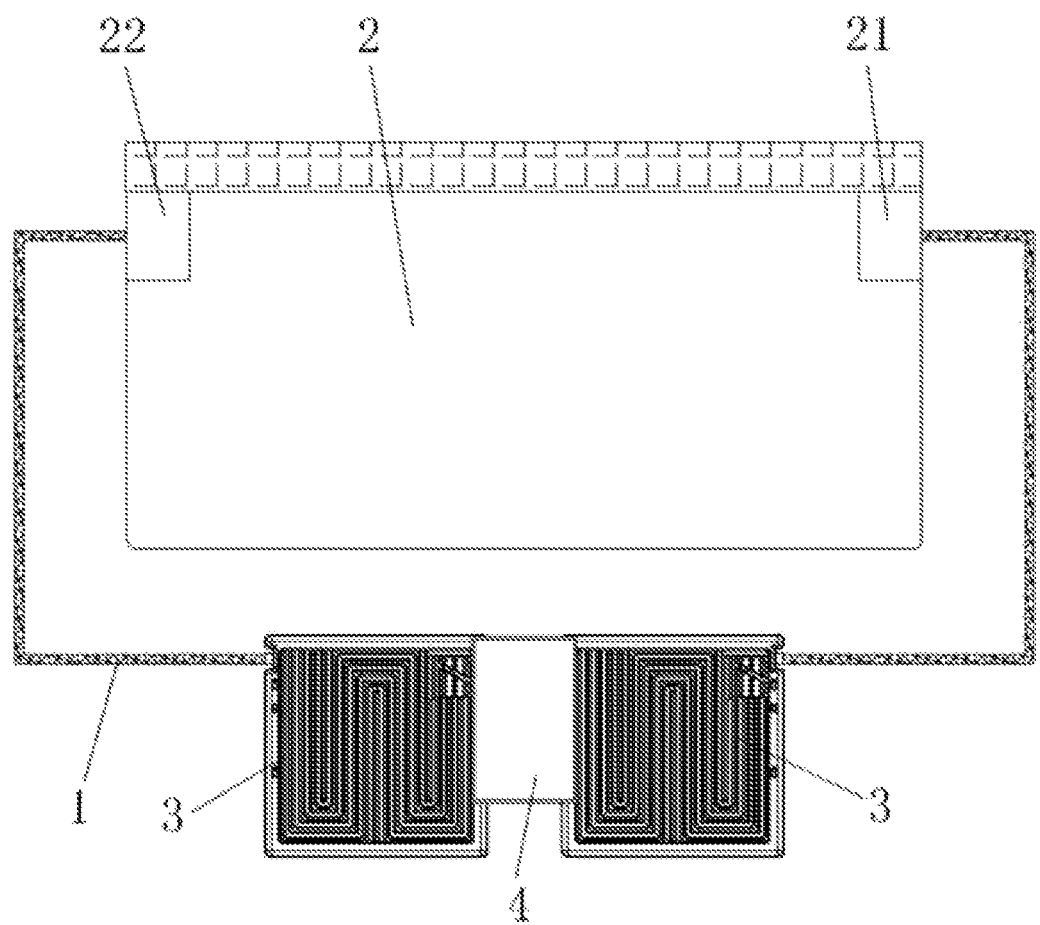
FIG. 1 shows the structure of the present utility model.
Figure 2:
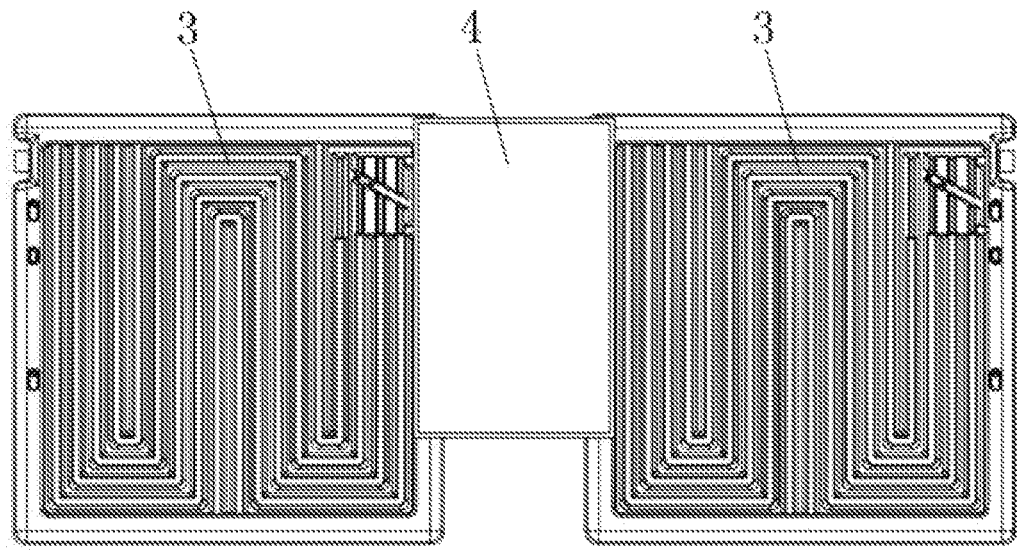
FIG. 2 shows the installation of solar heaters and the solar panel.
Figure 3:
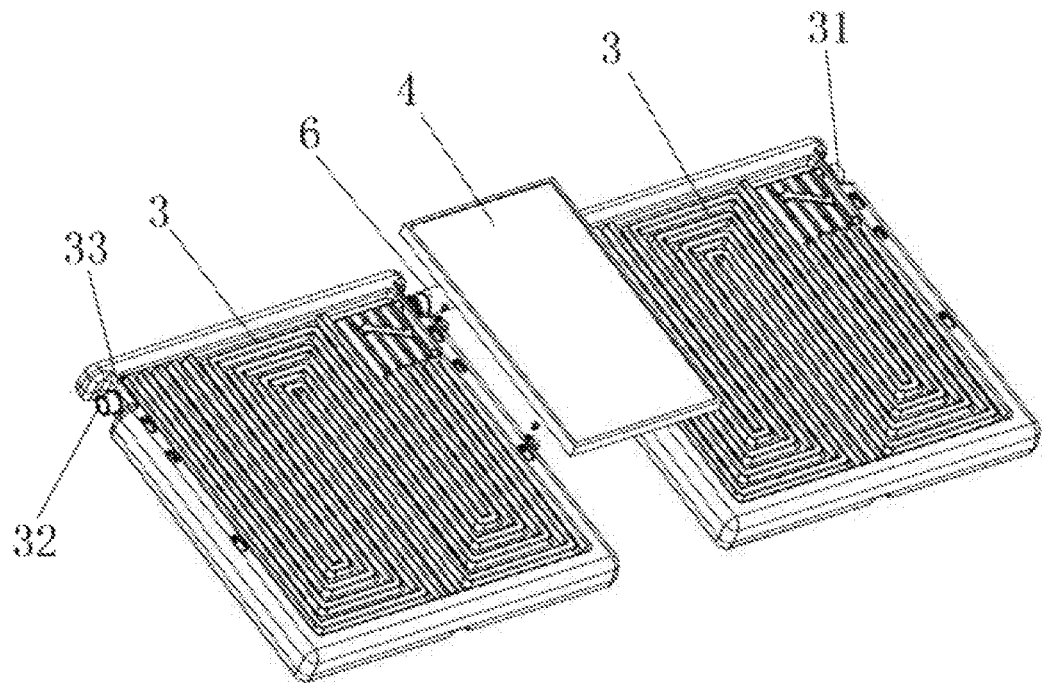
FIG. 3 is an exploded 3-D view of what is shown in FIG. 2.
Figure 4:
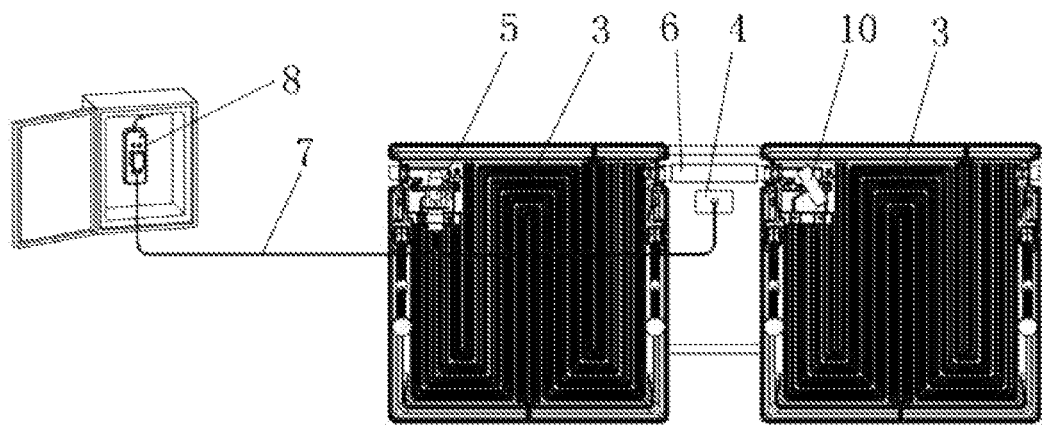
FIG. 4 shows the structure of the present utility model, wherein a power cord plug is arranged on the solar panel.

Description of reference numerals in FIG. 1 to FIG. 7: 1. Pipeline 2. Swimming pool 21. Cold-water outlet 22. Hot-water inlet 3. Solar heater 31. Water inlet opening 32. Water outlet opening 33. Groove 34. O-ring 35. Transverse slot 36. Water inlet connector 37. Water outlet connector 4. Solar panel 5. Water pump 51. Bottom cover 52. Screw 6. Connection pipe 7. Power cord plug 8. Mains socket 9. Leg 10. Outlet pipeline As shown in FIG. 1, a solar heating system for cyclic heating of a swimming pool mainly relates to a heating system which utilizes the solar heating technology to cyclically heat water in a swimming pool, the solar heating system structurally comprises a swimming pool 2, solar heaters 3, a solar panel 4 and a water pump 5, and the swimming pool 2, solar heaters 3 and water pump 5 are connected in turn with the pipelines 1 to form a waterway circulation.

A cold-water outlet 21 and a hot-water inlet 22 are arranged in the swimming pool 2 so that water in the swimming pool can cyclically be heated and maintain at a proper temperature after the pipelines 1 are connected.

At least said solar heaters 3 are arranged. The description of the embodiment is based on two solar heaters 3 installed side by side in FIGS. 2 to 4. In addition, a structure with two solar heaters 3 is the preferred structure.

Each solar heater 3 is in the shape of a rectangular plate, a groove 3 is respectively arranged at the top of the two sides of the rectangular plate, a water inlet opening 31 and a water outlet opening 32 are arranged in the two grooves, respectively, to form an embedded installation structure. The purpose of such a design is to guarantee that the connections between the pipelines 1 and the water inlet opening 31 and water outlet opening 32 of solar heaters 3 are hidden to avoid an airtight connection failure caused by any accidental collision at the joints.

In addition, the water inlet opening 31 and water outlet opening 32 of the solar heaters 3 are at the same horizontal level, and a connection pipe 6 is arranged between two adjacent solar heaters 3. In particular, the connection pipe is respectively connected to the water inlet opening 31 and the water outlet opening 32 of two adjacent solar heaters 3, that is to say, two adjacent solar heaters 3 are connected in series.

Figure 5:
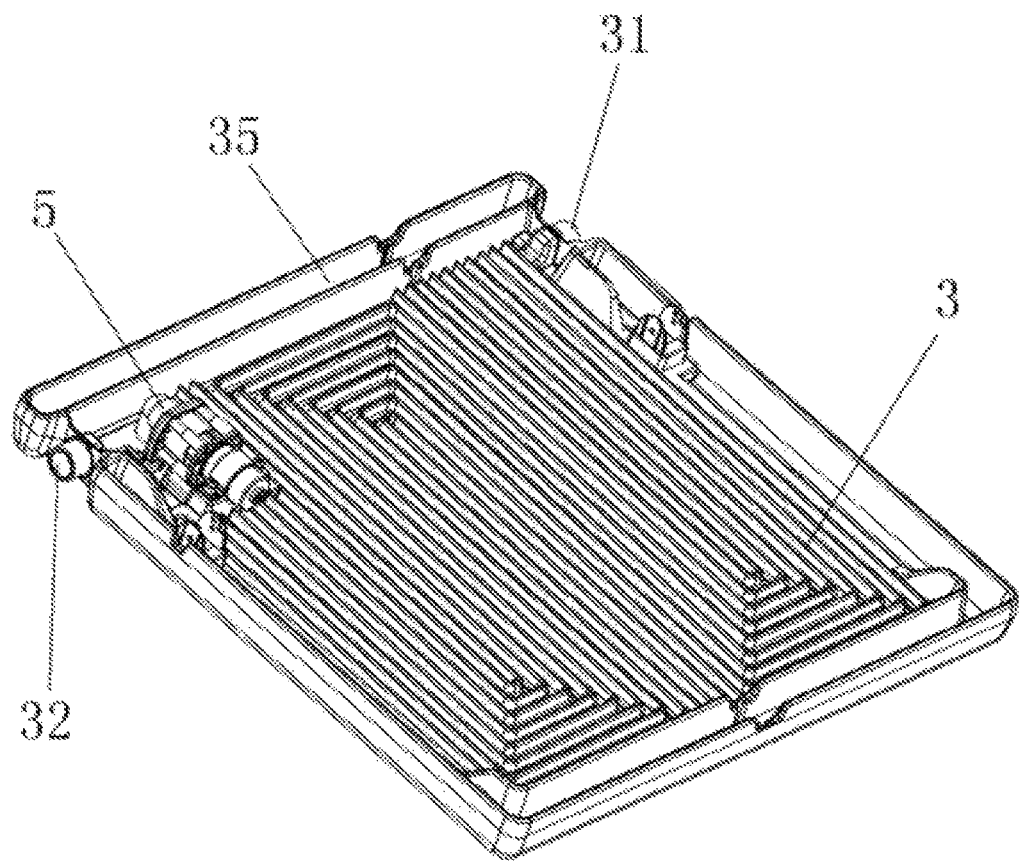
FIG. 5 shows the structure of the back of the solar panel.

As shown in FIG. 5, said water pump 5 is installed on the solar heaters 3 in an integrated way. Generally speaking, the water pump 5 only needs to be installed on either solar heater 3 in an integrated way and the connection in the same position on the other solar heater 3 can be realized through an outlet pipeline 10. The water pump 5 in the embodiment is a miniature water pump, whose volume is much smaller than that of an independent water pump used in a traditional solar heating system. A water pump 5 integrated into only a solar heater 3 can satisfy the requirement for water circulation. In addition, after the water pump 5 and the solar heater 3 form an integrated structure, only the connection of the solar heater 3 is involved at the disassembly and assembly. Thus, the solar heating system has the advantages such as compact structure, a small installation space, convenient disassembly and assembly and flexibility in application.

Figure 6:
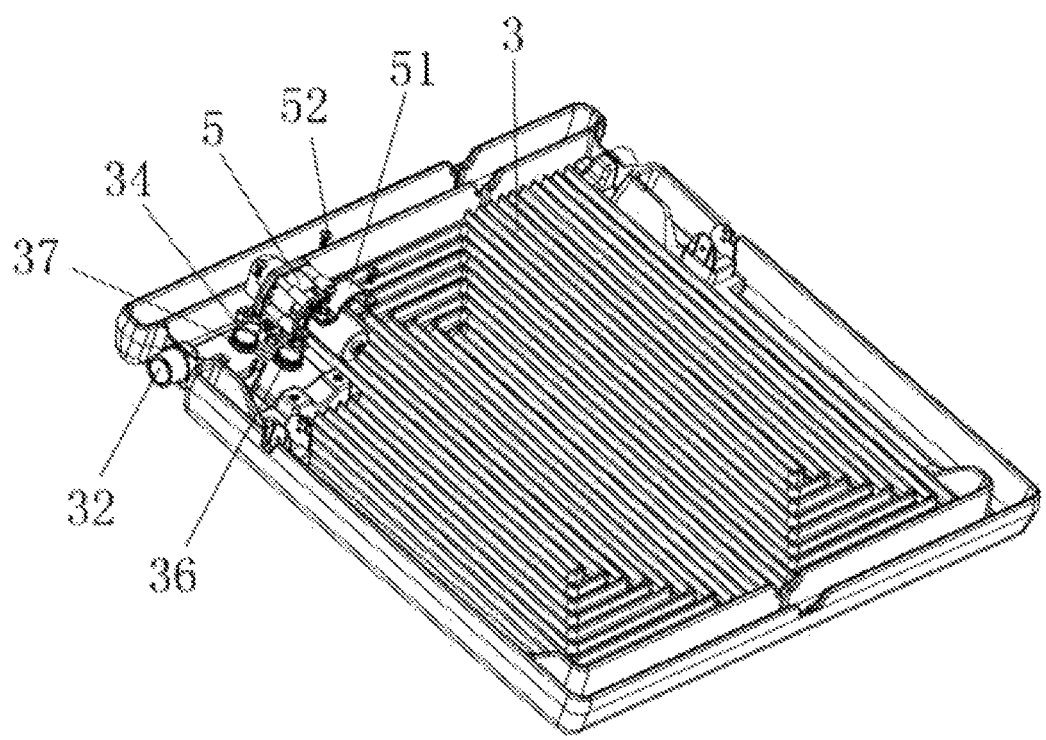
FIG. 6 is an exploded 3-D view of the installation of the water pump in FIG. 5.

FIG. 6 shows the installation of the water pump 5. An installation platform is arranged at the top left corner of the back of the solar heater 3. A water inlet connector 36 and a water outlet connector 37 which are connected with the solar heater 3 are arranged on said installation platform. Said water inlet connector and water outlet connector are raised cylindrical connectors. The water pump 5 is fixed on the platform by use of a plurality of screws 52. Through O-rings, the water inlet of the water pump 5 is airtightly connected with the water inlet connector 36, and the water outlet of the water pump is airtightly connected with the water outlet connector 37 so as to form a waterway connection between the water pump 5 and the solar heaters 3. A bottom cover 51 is arranged on the installation platform to press the water pump 5 so that the water pump closely touches the installation platform and the installation and fixing of the water pump 5 on the installation platform is guaranteed.

Figure 7:
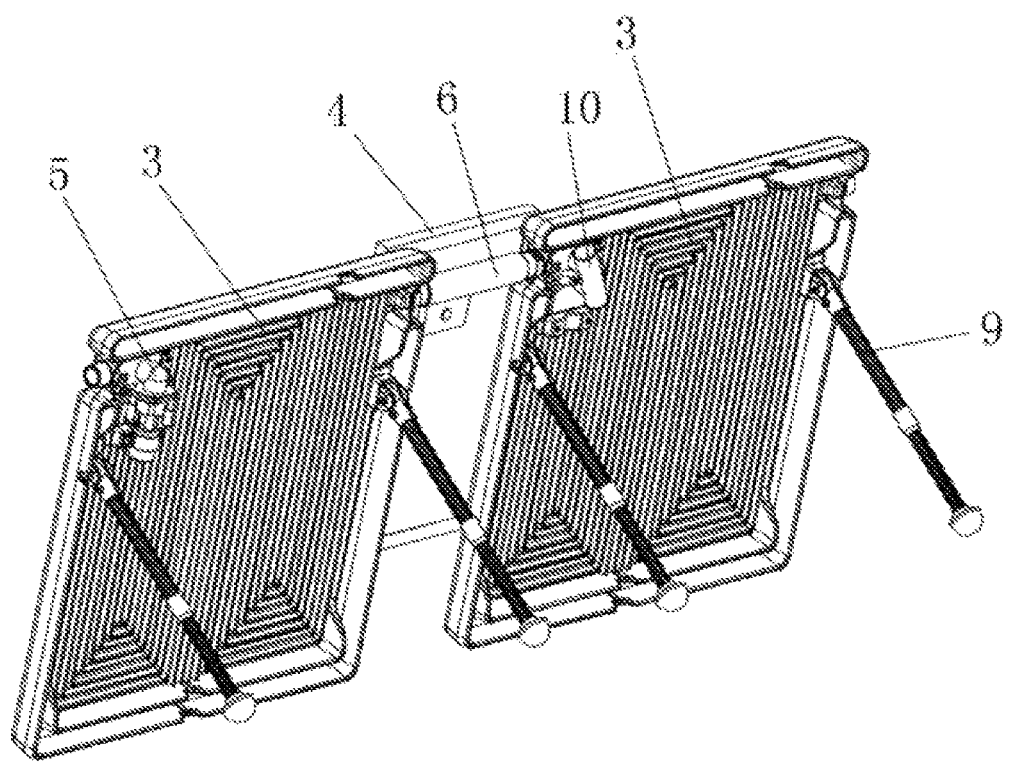
FIG. 7 shows the solar heaters obliquely supported by legs.

Legs 9 are arranged on the back of said solar heaters 3. As shown in FIG. 7, legs 9 are arranged on the two sides of the back of the solar heaters 3, the upper end of each leg is hinged on a hinge seat on the back of the solar heater 3, the lower end of each leg 9 is free, and the length of the lower end is adjustable. When the upper ends of the legs 9 rotate around the upper hinge points, the lower ends of the legs 9 can obliquely be supported on the ground. The light-receiving area of the solar heaters 3 can flexibly adjusted according to the light application time and position to enhance the heating effect of the solar heaters 3 by adjusting the length of the lower ends of the legs 9, or the accommodating volume can be reduced by drawing back the legs 9 to closely touch the back of the solar heaters 3.

A transverse slot 35 is arranged at the top of the back of the solar heater to facilitate the lifting and handling of the solar heater 3.

Said solar panel 4 is installed on the connection pipe 6. The water pump 5 is connected with the solar panel as a power supply circuit so that the solar heating system can be used normally in an outdoor place far away from a mains socket 8. The application place is not restricted and the scope of application is wide. Of course, a power cord plug 7 can also be arranged on the solar panel 4 so that it can directly be connected to a mains socket 8, or when no solar panel 4 is available, the water pump 5 can also be directly connected with the mains socket through the power cord plug 7.

The working process of the present utility model is as follows: After the water pump 5 is started, the water in the swimming pool 2 goes through the cold-water outlet 21 into the pipeline and enters the solar heaters 3 in turn, each solar heater absorbs the heat of sunlight to heat the water passing by the solar heater, and the heated water passes through the pipeline 1 again into the hot-water inlet 22 and is poured into the swimming pool 2 again. Thus, waterway circulation is realized and a proper water temperature is maintained in the swimming pool.

Such a solar heating system resists corrosion of chlorine water in a swimming pool, the materials comply with the requirements for environment protection, the heated water in a swimming pool is not polluted, and no scale is produced. The running expense of the solar heating system is much lower than that of a heating system using electricity, coal or gas as an energy. The use of the solar heating system is simpler and more stable. Full automation is realized for the solar heating system so that it is convenient for an ordinary person to manage the solar heating system.

The above is only a particular embodiment of the present invention. Those skilled in the art should understand that any structure design equivalent to the embodiment should fall within the scope of protection of the present invention.

The invention claimed is:

1. A solar heating system for cyclic heating of a swimming pool, comprising a swimming pool, solar heaters and a water pump which are airtightly connected with pipelines in turn to form a waterway circulation, wherein a solar panel is arranged on one side of said solar heaters, said water pump is installed on one of the solar heaters in an integrated way, and said water pump is connected with not only the solar heater as a waterway, but also the solar panel as a power supply circuit;

wherein an installation platform is arranged on the back of said solar heaters, a water inlet connector and a water outlet connector which are connected with the solar heater are arranged on said installation platform, said water pump is fixedly installed on the platform by use of a plurality of screws, a water inlet of the water pump is airtightly connected with the water inlet connector, and a water outlet of the water pump is airtightly connected with the water outlet connector through O-rings.

2. The solar heating system for cyclic heating of a swimming pool as claimed in claim 1, wherein legs are arranged on a back of said solar heaters, upper ends of said legs are hinged on the back of the solar heaters, lower ends of said legs are free, and a length of the lower ends is adjustable.

3. The solar heating system for cyclic heating of a swimming pool as claimed in claim 2, wherein said legs rotate around upper hinge points and the lower ends of said legs are obliquely supported on the ground or touch the back of the solar heaters.

4. The solar heating system for cyclic heating of a swimming pool as claimed in claim 1, wherein said installation platform is arranged at a top left corner of the back of the solar heater and a bottom cover for pressing and fixing the water pump is arranged on the platform.

5. The solar heating system for cyclic heating of a swimming pool as claimed in claim 1, wherein at least two of said solar heaters are arranged, a connection pipe is arranged between two adjacent solar heaters of the at least two of said solar heaters and said solar panel is installed on said connection pipe.

6. The solar heating system for cyclic heating of a swimming pool as claimed in claim 1, wherein a power cord plug is arranged on said solar panel.

7. The solar heating system for cyclic heating of a swimming pool as claimed in claim 1, wherein said solar heaters are in the shape of a rectangular plate and a water inlet opening and a water outlet opening are respectively arranged on the two sides of the rectangular plate.

8. The solar heating system for cyclic heating of a swimming pool as claimed in claim 7, wherein a groove is respectively arranged on the two sides of said rectangular plate, and said water inlet opening is embedded in the groove arranged on one side of the two sides of said rectangular plate and water outlet opening is embedded in the groove arranged on another side of the two sides of said rectangular plate.

9. The solar heating system for cyclic heating of a swimming pool as claimed in claim 1, wherein a transverse slot is arranged at a top of the back of said solar heaters.

* * * * *